Patented Aug. 11, 1931

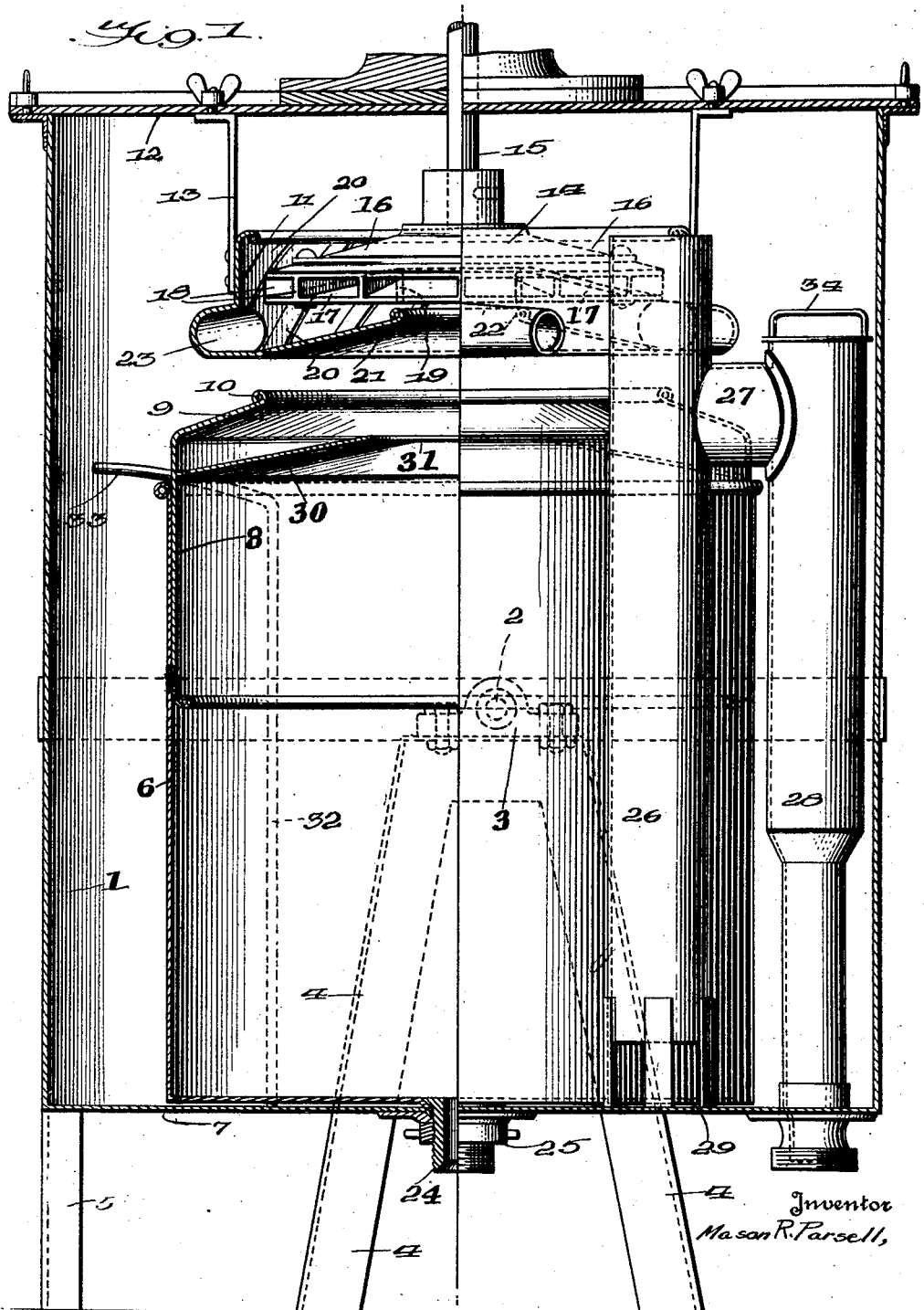

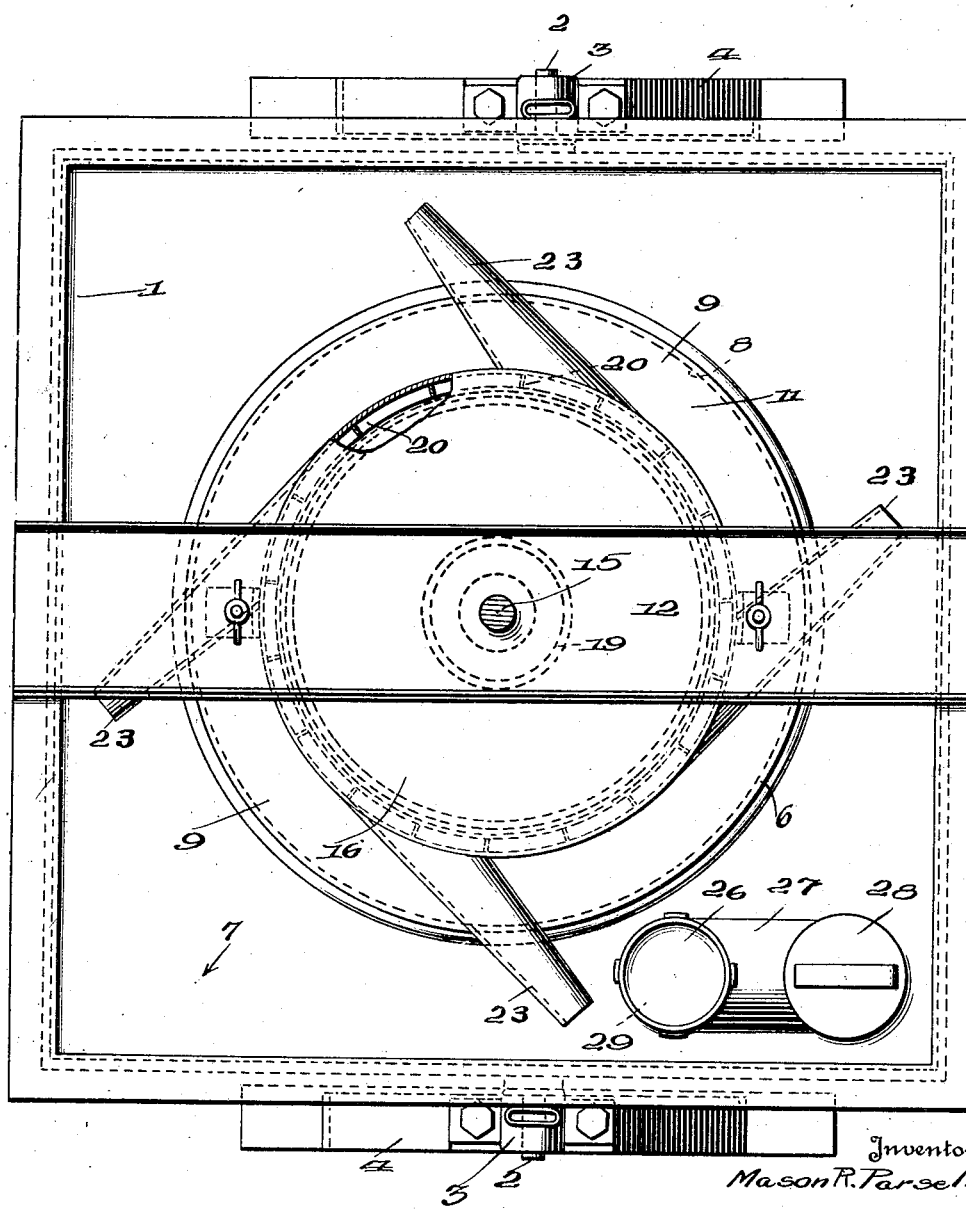

1,818,962

UNITED STATES PATENT OFFICE

MASON RAYMOND PARSELL, OF BALTIMORE, MARYLAND

APPARATUS FOR ELIMINATING FOAM FROM MILK AND OTHER LIQUIDS

Application filed June 27, 1929. Serial No. 374,120.

This invention relates to an apparatus for destroying foam in milk and other liquids and more particularly the treatment of skimmed milk to yield a frothless product.

When milk is skimmed, the treatment which it undergoes in the cream separator introduces undesirable quantities of air that result in an excessive amount of foam or froth. This froth or foam has been found very objectionable in the subsequent handling and treatment of skimmed milk and it is highly desirable to free the milk from this objectionable association.

Among the objects of this invention is to provide an apparatus for breaking up the froth in skimmed milk and other liquids and to liberate the gas contained therein and thus render the liquid substantially gas-free.

A further object of this invention is to provide an apparatus for accomplishing these results in a simple, effective, efficient and highly improved manner.

Other, further and more specific objects of this invention will become readily apparent to persons skilled in the art from a consideration of the following description when taken in conjunction with the accompanying drawings wherein:

Fig. 1 is a vertical section showing a specific embodiment of the foam destroying mechanism.

Fig. 2 is a top plan view of the device shown in Fig. 1 and with the cover and driving mechanism removed.

The apparatus comprises the outer vessel 1 mounted on trunnions 2 journaled in a suitable bearing 3 fastened upon the legs or supports 4. The vessel 1 can be tilted into position for ready cleaning and washing of the interior. The trunnions 2 are not radial with respect to the circumference of the vessel 1 but are positioned slightly to one side of the diameter in order that the vessel 1 will tip in one direction only, preferably forwardly but not rearwardly. A block or support 5 is placed at the front end of the vessel 1 to limit the downward movement. By this means the vessel 1 is stable when the milk or other liquid is introduced therein and will not vibrate as when it is evenly balanced on the trunnions.

Within the vessel 1 is a cylindrical inner chamber 6 extending from near the bottom 7 of the vessel 1 to a point above the middle of the vessel 1. A drum 8 having a frustro-conical top 9 fits tightly into the top of the chamber 6 and the frustro-conical top 9 has an open neck 10 at the constricted middle portion. A collecting collar 11 is hung from the top 12 of the vessel 1 by means of the angle-irons 13 and reaches almost to the neck 10 of the drum 8. When in operative position, the collar 11 is slightly above the neck 10 of the drum 8. The height of this drum is adjustable, and if desired the space between the drum 8 and the collar 11 may be regulated.

A rotor 14, which is keyed to the shaft 15 and joined thereby to some suitable source of power such as an electric motor, is disposed so that it may be lowered into and raised from the collecting collar 11, the shaft 15 passing through the top 12. The rotor 14 comprises a pair of domes 16 and 17 held in closely spaced relation to each other. A plurality of webs 18 are distributed between the two domes and extend from the periphery toward the center and terminate at the neck 19 of the lower dome 17. The collecting collar 11 is provided with a plurality of ribs 20 projecting inwardly and in angular inclination to the axis of the collar. The top of this collar 11 is beaded and open, so that the rotor 14 may be inserted and withdrawn therefrom. The bottom of the collar 11 is indented inwardly and in the form of a frustro-conical dome 21 terminating in the constricted central neck 22. This neck 22 registers with the neck 19 of the rotor 14 when the mechanism is in operative position. The collar 11 is also provided with a plurality of spouts 23 which form outlet passages from the interior of the collar to the interior of the vessel 1.

The milk or other liquid to be treated is introduced into the inner chamber 6 from a suitable source of supply through the inlet pipe 24 which is connected by a coupler 25 to a pipe or conduit leading to the source of supply. The milk flows upwardly through the chamber 6 and then through the drum 8 and passes out through the open neck 10. The frustro-conical dome 9 and constricted neck 10 operate to converge the flow of the milk so that it will issue from the drum 8 immediately below collecting collar 11. The rotor 14 having been set in motion, as the milk passes out of the neck 10, the lighter froth or foam will be sucked upwardly through the neck 22 of the collecting collar and the neck 19 of the rotor 14, then projected outwardly through the passages formed by the domes 16 and 17 and the webs 18 and will impinge upon the ribbed wall of the collar 11. These ribs 20 are edged, and the milk froth striking these sharp ribs with great impact and at high velocity will break up the foam, thereby releasing the occluded air or gas and freeing the milk therefrom. The degassed milk is directed downwardly by the sloping ribs 20 and passes out through the spouts 23 into the interior of vessel 1 and outside of the chamber 6.

The foam-free milk gravitates to the bottom of the vessel 1 and is withdrawn therefrom by means of an inverted-U passage located within the vessel 1 and between its outer wall and the inside chamber 6 and passes upwardly through the leg 26 over the bridge 27 and out through the other leg 28 of the inverted-U passage to a storage chamber or to other apparatus for further treatment. The open end of the leg 26 is disposed within a well 29 so that the milk which is withdrawn is taken from the bottom of the vessel 1. The inverted-U passage serves to regulate the level of the liquid in the vessel 1.

When the rotor 14 is in motion, a very vigorous circulation and whirling movement is set up in the liquid within the chamber 6 and drum 8. This circulating and whirling liquid causes the entire apparatus to shake and vibrate to a very objectionable extent and also draws foam into the interior of the body of milk. In order to overcome this I provide the drum 8 with a false bottom 30, having an opening 31. The area of this opening 31 is about 10 to 20 per cent that of the neck 10 of the drum 8. This false bottom 30 effectively arrests circulation and whirling motion of the liquid and thus eliminates this objectionable shaking and vibration of the apparatus and keeps the foam at the top of the liquid instead of creating an objectionable mixture of foam and milk.

When cleaning and washing this apparatus it is often desirable to withdraw the inner chamber 6 and drum 8. This may be readily accomplished with applicant's device by removing the collar 11, rotor 14 and top 12 of the vessel 1, tilting the vessel 1 until its axis is approximately horizontal, detaching the coupler 25 from the pipe 24, and then withdrawing the chamber 6 and drum 8. When reintroducing the chamber 6 into the vessel 1, in order to facilitate alignment of the pipe 24 with the opening in the bottom 7 of the vessel 1, I have provided guide rods 32 extending upwardly from the bottom 7 of the vessel 1 and having the arms or bends 33 by which the rods are connected to the wall of the vessel 1.

For the purpose of cleaning the inverted-U passage, and to admit of inspection, I preferably provide a detachable cover 34 at the top of the leg 28.

Skimmed milk treated by my new apparatus is rendered substantially frothless, and is very well adapted for the various processes employing skimmed milk as a basic material in the manufacture of a wide variety of dairy products.

Although in the specific examples given herein, skimmed milk is used in illustration, it is to be understood that my new process and apparatus may be employed for the treatment of nonskimmed milk as well as other liquids for the purpose of removing air and other gases therefrom and destroying the foam or froth therein.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In an apparatus for treating froth and foam of liquids, a rotor for sucking the foam from the liquid and comprising a central opening with outwardly extending passages reaching to its periphery and an internally-ribbed collecting collar surrounding said rotor, said collar being spouted for ejecting from the interior of the collar the liquid component of the foam after separation of the liquid from the occluded gas.

2. In an apparatus for treating froth and foam of liquids, a vessel, a rotor for sucking foam from the liquid and comprising a central opening with outwardly extending passages reaching to its periphery, a collecting collar surrounding said rotor, means for regulating the liquid level in said vessel, said collecting collar having a plurality of ribs extending inwardly from its wall and a plurality of spouts projecting outwardly and said rotor and collar being disposed above and near to the top surface of the foam on the body of liquid.

3. In an apparatus for treating froth and foam of liquids, a vessel, means for regulating the liquid level in said vessel, a rotor within said vessel for sucking foam from the liquid therein and comprising a central opening with outwardly extending passages reaching to its periphery, a collecting collar surrounding said rotor, said collecting collar having a plurality of ribs extending inwardly from its wall and a plurality of spouts projecting outwardly for ejecting from the interior of the collar the liquid component of the foam after separation of the liquid from the occluded gas, an inner chamber within said vessel for delivering the froth to be treated to the rotor, said inner chamber having a constricted outlet positioned below the central opening of the rotor for directing the froth toward the central opening of said rotor.

4. In an apparatus for treating froth and foam of liquids, a vessel, a chamber within said vessel, means for introducing liquid within said chamber, means for regulating the liquid level in said vessel, means for limiting circulation of liquid within said chamber, a rotor within said vessel for sucking foam from the liquid therein and comprising a central opening with outwardly extending passages reaching to its periphery, a collecting collar surrounding said rotor, said collecting collar having a plurality of ribs extending inwardly from its wall and a plurality of spouts projecting outwardly for ejecting from the interior of the collar the liquid component of the foam after separation of the liquid from the occluded gas and said rotor and collar being disposed above and near to the top surface of the foam on the body of liquid.

5. In an apparatus for treating froth and foam of liquids, a vessel, means for regulating the liquid level in said vessel, a rotor within said vessel for lifting by suction part of the froth away from the main body of froth, a collar surrounding said rotor and having perforations for ejecting from the interior of the collar the liquid component of the foam after separation of the liquid from the occluded gas, an inner chamber within said vessel having a constricted outlet positioned below the rotor for directing the froth toward the inlet of said rotor, said rotor and collar being disposed above and near to the top surface of the foam on the body of liquid.

In testimony whereof I affix my signature.

MASON RAYMOND PARSELL.